(12) United States Patent  (10) Patent No.:  US 7,774,381 B2
Kothuri et al.  (45) Date of Patent:  Aug. 10, 2010

(54) TRIANGULATED IRREGULAR NETWORK

(75) Inventors: Ravi Kothuri, Nashua, NH (US); Siva Ravada, Nashua, NH (US); Edward Fisher, Brookline, NH (US)

(73) Assignee: Oracle Int'l Corp., Redwood Shores, CA (US)

( * ) Notice: Subject to any disclaimer, the term of this patent is extended or adjusted under 35 U.S.C. 154(b) by 364 days.

(21) Appl. No.: 12/069,089

(22) Filed: Feb. 7, 2008

(65) Prior Publication Data

US 2009/0204632 A1  Aug. 13, 2009

(51) Int. Cl.
*G06F 7/00* (2006.01)
*G06F 17/30* (2006.01)

(52) U.S. Cl. ...................................... 707/803; 707/802
(58) Field of Classification Search .................. 707/802, 707/803
See application file for complete search history.

(56) References Cited

U.S. PATENT DOCUMENTS

| | | | | |
|---|---|---|---|---|
| 6,075,541 | A * | 6/2000 | Maclinovsky | 345/423 |
| 6,100,893 | A * | 8/2000 | Ensz et al. | 345/420 |
| 6,985,901 | B1 * | 1/2006 | Sachse et al. | 1/1 |
| 7,634,353 | B2 * | 12/2009 | Meunier et al. | 701/120 |
| 2002/0147703 | A1 * | 10/2002 | Yu et al. | 707/2 |

OTHER PUBLICATIONS

Kang, In-Soo, et al., "A Spatial Data Mining Method by Delaunay Triangulation", GIS 97, Las Vegas, NV, © 1997, pp. 35-39.*
Martin, Wayne, "Fast Equi-Partitioning of Rectangular Domains Using Stripe Decomposition", Mathematical Programming Technical Report 96-02, Technical Reports of the Optimization Group in UW-Madison Computer Sciences Group, Feb. 1996, pp. 1-13.*
Zhao, Renliang, et al., "An Effective Method For Calculating Natural Adjacency Relation in Spatial Database", PAKDD 2007, LNAI 4426, Springer-Verlag, Berlin, Germany, © 2007, pp. 1131-1139.*
Ai, Tinghua, et al. "The Hierarchical Watershed Partitioning and Data Simplification of River Network", Progress in Spatial Data Handling, Springer-Verlag, Berlin, Germany, © 2006, pp. 617-632.*

* cited by examiner

*Primary Examiner*—Robert Stevens
(74) *Attorney, Agent, or Firm*—Kraguljac + Kalnay, LLC (57) ABSTRACT

Methods and other embodiments associated with performing an in-memory triangulation of an arbitrarily large data set are described. One example method for performing in-memory triangulation of an arbitrarily large data set includes striping a data set into multiple stripes, selecting a first stripe to triangulate, and then performing an in-memory triangulation on the stripe. The method may also include removing certain triangles from the triangulated irregular network produced by the triangulation, merging another stripe with the leftover data, and repeating the process until the arbitrarily large data set has been triangulated piece-by-piece, with the triangulations occurring in memory.

25 Claims, 10 Drawing Sheets

Figure 10

TRIANGULATED IRREGULAR NETWORK

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A triangulated irregular network (TIN) may be represented by data stored in a data structure. A TIN may be used to describe, for example, a three-dimensional surface as a set of irregularly shaped triangles. For example, a surface may be represented as a set of contiguous, non-overlapping triangles. Thus, a TIN may be used in a geographic information system to, for example, facilitate region approximation. A TIN may be used in connection with terrain modeling where terrain characteristics are determined from sets of irregularly distributed points. Within a triangle, a surface is represented by a plane. A triangle may be formed from a set of points known as mass points.

In one example, points used to form the irregular triangles may have x, y, and z coordinates associated with a three-dimensional data point in space on the surface. A terrain may be created by connecting triangles formed from three points represented by (x, y, z) coordinates. Therefore, a TIN may store information that describes the set of irregular triangles. This information may be stored, for example, triangle-by-triangle, point-by-point with neighbor information, and so on.

Delaunay triangulation is one method for performing triangulation. Delaunay triangulation is a proximal method that satisfies the requirement that a circle drawn through the three nodes of a triangle will contain no other node. Triangles formed using Delaunay triangulation have certain advantages. For example, triangles formed using Delaunay triangulation tend to be relatively equiangular. Additionally, Delaunay triangulation tends to be performable independent of the order in which points are processed and tends to ensure that any point on the surface is as close as possible to a node.

Conventionally, it has been difficult, if possible at all, to do in-memory triangulation of arbitrarily large data sets due, for example, to finite memory resources. Some conventional solutions have attempted to remedy this situation by gridding a data set and doing piece-wise in-memory processing. However, excessive boundary conditions associated with gridding have limited the effectiveness of these conventional solutions. Furthermore, these in-memory solutions have not scaled well to arbitrarily large sets of data points.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

In one embodiment, an arbitrarily large data set is "striped" to facilitate in-memory triangulation of data points. In one example, a local triangulated irregular network (TIN) can be created for a stripe. Triangles associated with the stripe can be written to a large object (LOB) associated with the stripe. Additionally, corresponding points can be written to a points LOB associated with the stripe. Stripes can be processed individually with border conditions between stripes being handled one at a time. Thus, the entire arbitrarily large data set can be processed in-memory one part at a time to fill the LOBs with a complete set of triangles and/or corresponding points representing a TIN for the arbitrarily large data set. While an LOB is described, it is to be appreciated that triangles and/or corresponding points may be stored in other data stores and/or structures.

Figure 1:
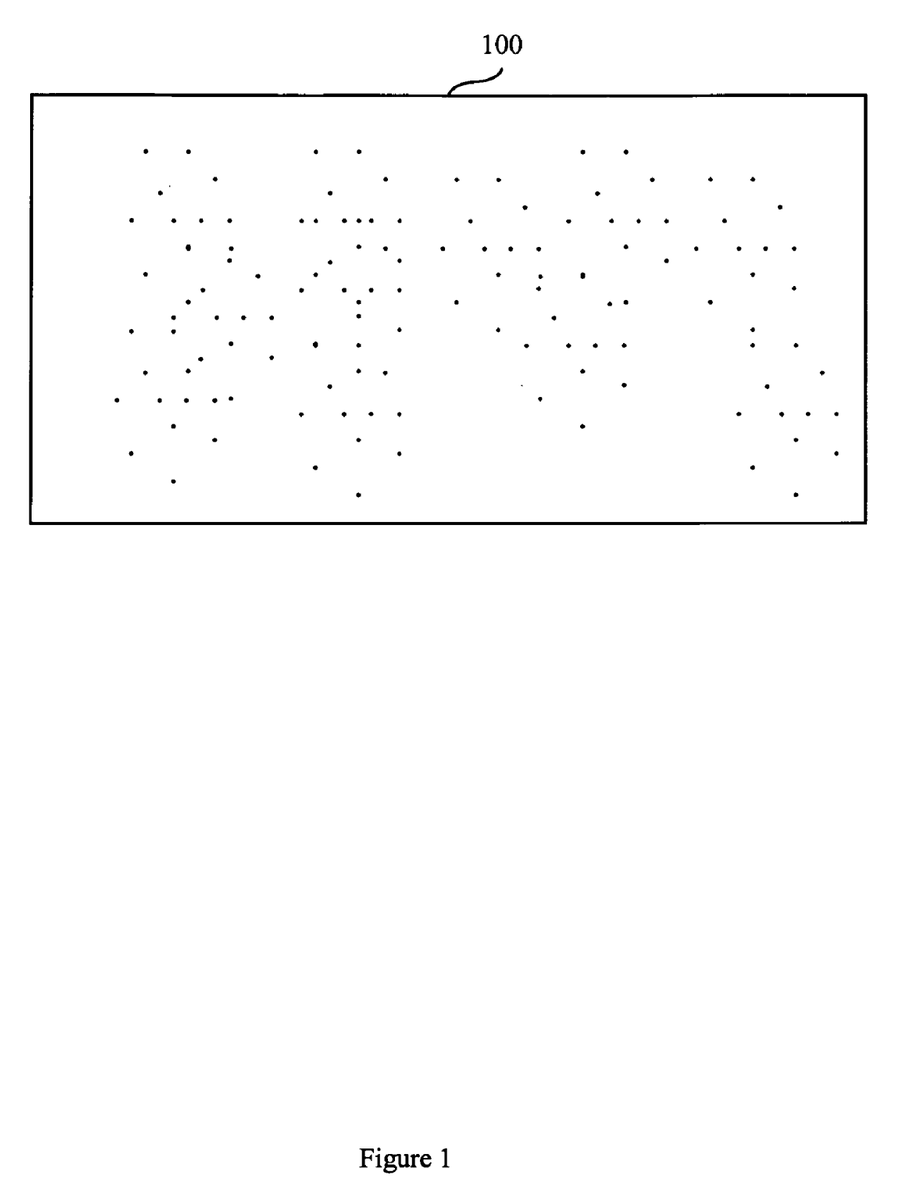
FIG. 1 illustrates an arbitrarily large data set.
Figure 2:
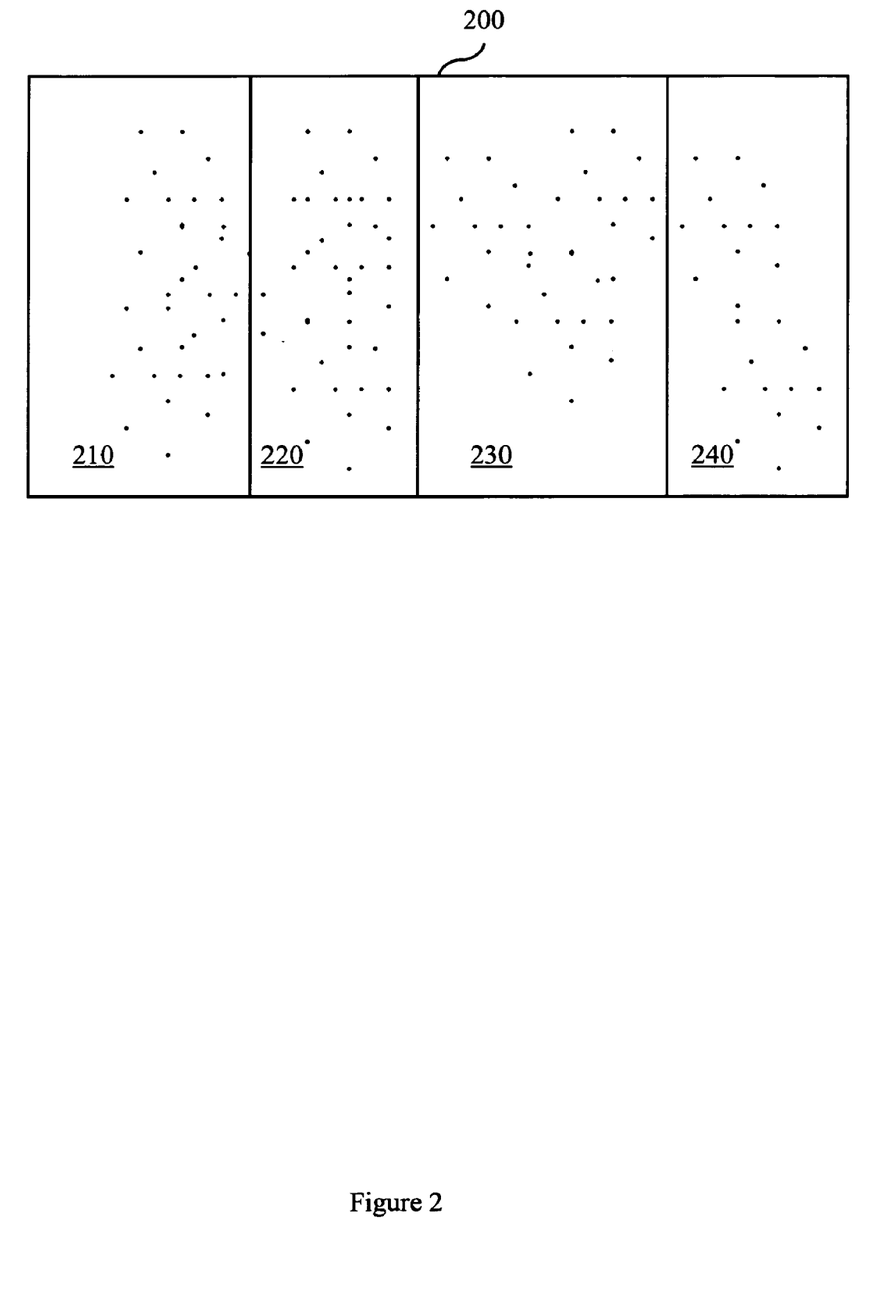
FIG. 2 illustrates an arbitrarily large data set partitioned into "stripes".

FIG. 1 illustrates an arbitrarily large data set 100. This set 100 may be too large to perform in-memory triangulation. Therefore, data set 100 may be "striped". Striping may involve, for example, partitioning the data set into a number of smaller data sets by dividing the data set along a single axis (e.g., horizontal, vertical). FIG. 2 illustrates an arbitrarily large data set 200 that has been striped (e.g., partitioned) into four stripes 210, 220, 230, and 240. Each of these data sets may be small enough so that in-memory triangulation may be performed on them. While four stripes are illustrated it is to be appreciated that a greater (e.g., hundreds), much greater (e.g., millions), and/or lesser number of stripes may be produced. Also, while vertical striping is illustrated, it is to be appreciated that striping may be performed vertically, or horizontally. In different examples, stripes may have a uniform width or may have a varying width. The width may depend, for example, on a maximum number of data points possible in a stripe, on each stripe covering a percentage (e.g., one percent) of the entire data set, and so on. The size of a stripe may be determined, for example, based on the memory currently available for performing triangulation.

Figure 3:
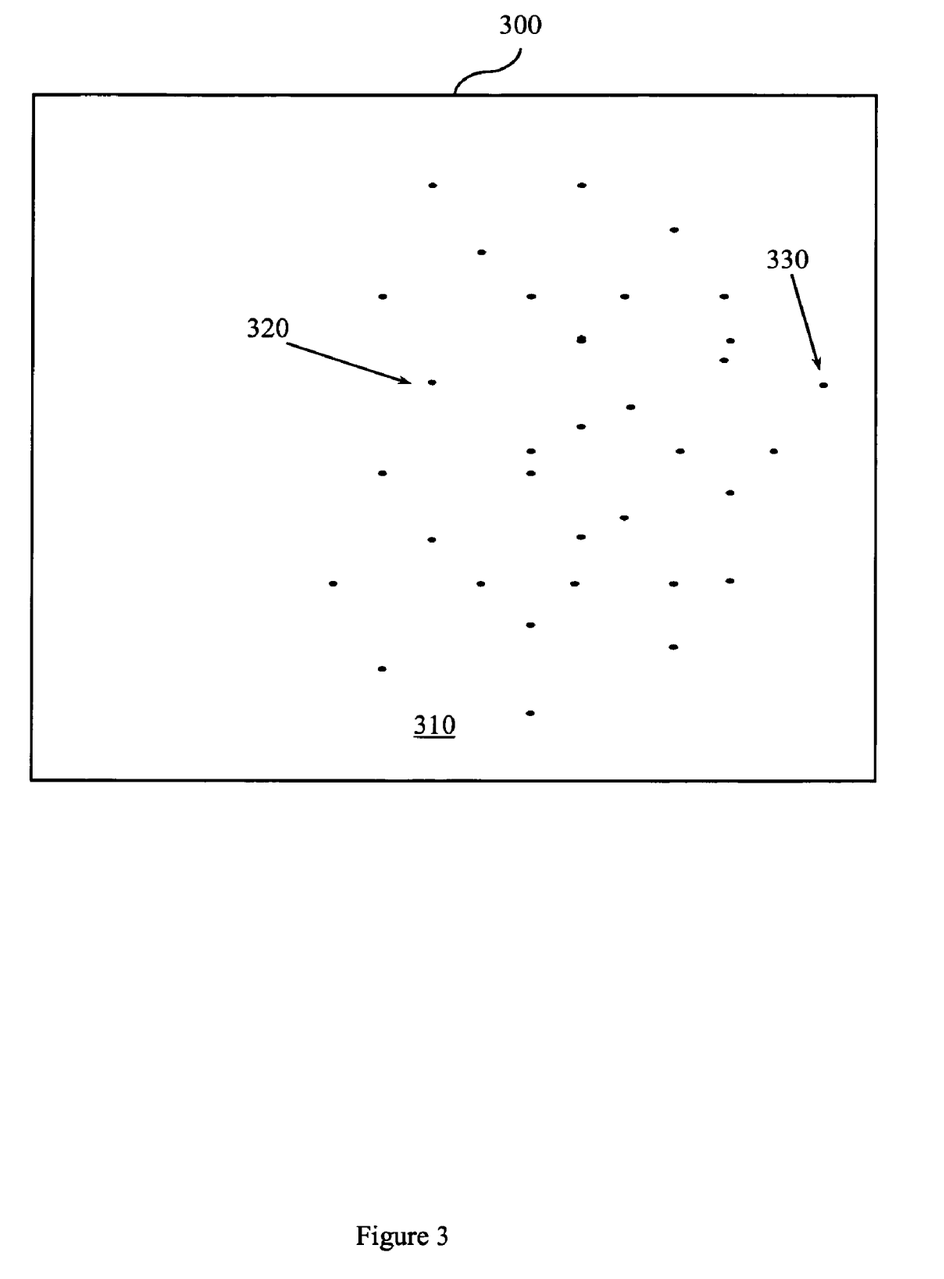
FIG. 3 illustrates a single stripe.

The data set may be striped, and then in-memory triangulation may be performed on a stripe. FIG. 3 illustrates a close up of a single stripe 300 that includes a small enough set of points 310 so that in-memory triangulation may be performed. The in-memory triangulation may be, for example, Delaunay triangulation. Some data points (e.g., 320) will likely be triangulated into "safe" triangles while other data points (e.g., 330) may be triangulated into "unsafe" triangles.

A "safe" triangle may be defined as a triangle whose circumscribing circle does not cover any additional points beyond the three that form the triangle and whose circumscribing circle does not overlap a currently shared stripe boundary. A currently shared stripe boundary is a boundary that is common between two stripes that are being merged. An "unsafe" triangle may be defined as a triangle whose circumscribing circle overlaps a currently shared stripe boundary. In the unsafe condition it cannot be determined whether the circumscribing circle covers any additional points beyond the three that form the triangle because some points may be in a neighboring stripe and thus unavailable for analysis.

Figure 4:
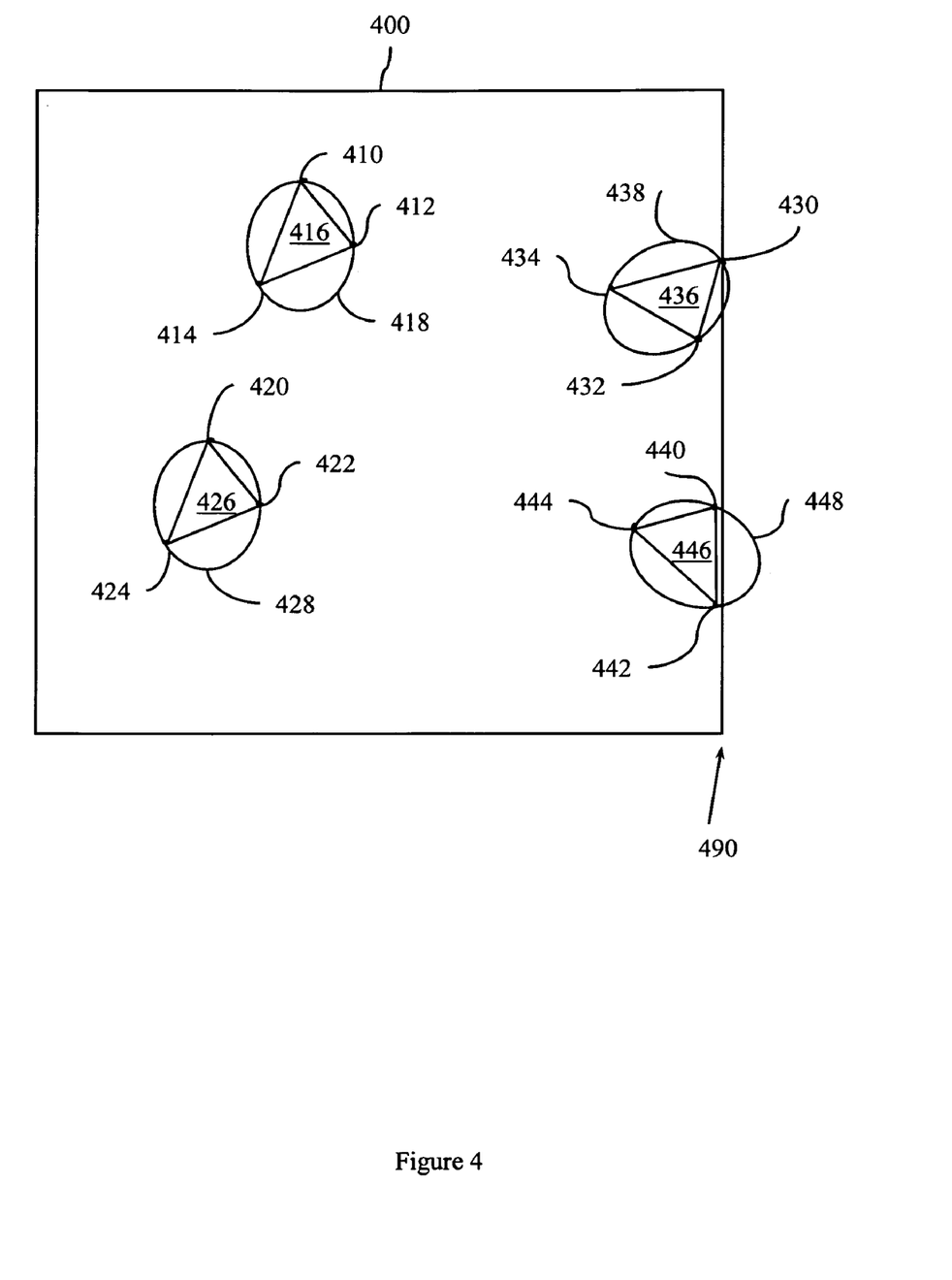
FIG. 4 illustrates the result of processing data points in a single stripe using Delaunay processing.

FIG. 4 illustrates a stripe 400 in which twelve data points have been triangulated into four triangles each having circumscribing circles. A first set of points (410, 412, 414) form a first triangle 416 that has been circumscribed by a circle 418. This is a safe triangle since it neither intersects with a stripe boundary (e.g., boundary 490) nor covers any additional points. Thus, these data points and/or triangle can be removed from stripe 400 by adding appropriate information to a TIN data store(s). Similarly, a second set of points (420, 422, 424) form a second triangle 426 that has been circumscribed by a circle 428. This is also a safe triangle that can be removed from stripe 400. However, a third set of data points (430, 432, 434) and a fourth set of data points (440, 442, 444) form two unsafe triangles (436, 446). Triangle 436 is circumscribed by circle 438, which overlaps with boundary 490. Since the circle 438 overlaps the boundary 490, it cannot be determined whether circle 438 covers any additional points. Similarly, triangle 446 is circumscribed by circle 448, which also overlaps with boundary 490.

"Safe" triangles (e.g., 416, 426) may be "removed" from the stripe 400 by, for example, updating a TIN data structure(s) with information describing the data points and the triangle. This information may be, for example, a set of triangles stored triangle-by-triangle, a set of data points (e.g., (x, y, z)) stored point-by-point with neighbor information, and so on. In one example, a safe triangle can be stored in a triangles object and corresponding points can be stored in a points object. The objects may be, for example, a large object (LOB), a binary large object (BLOB), and so on. Similarly, "unsafe" triangles may be stored in an associated object and corresponding points may be stored in another object. These objects may then be used when stripes are merged during later processing.

Figure 5:
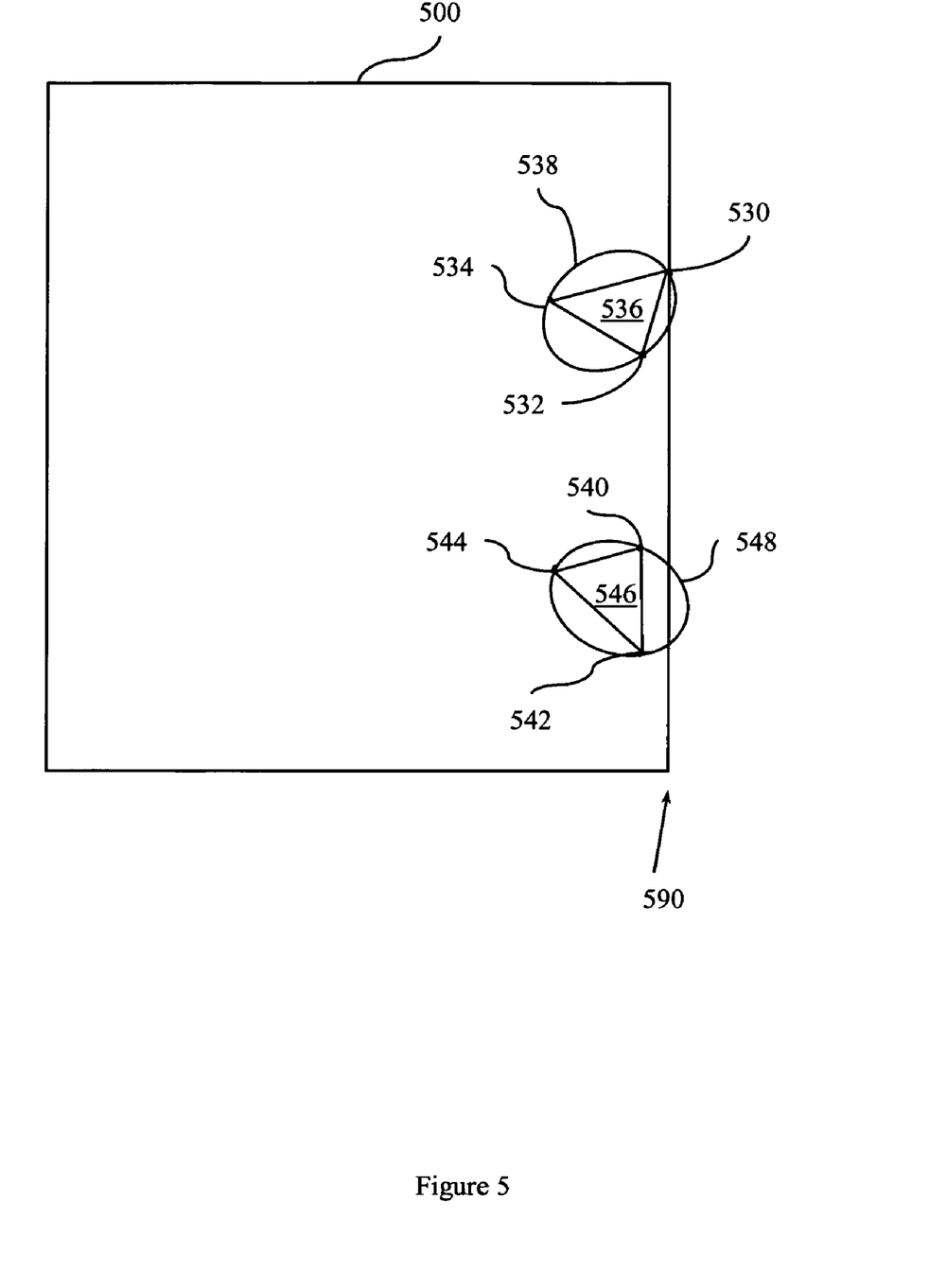
FIG. 5 illustrates a single stripe from which safe triangles have been removed.

Once safe triangles are removed, only non-triangulated points (if any) and unsafe triangles remain. Thus, FIG. 5 illustrates a stripe 500 having only unsafe triangles. Stripe 500 includes no non-triangulated points. The unsafe triangles (e.g., 536, 546) may represent a small number of data points (e.g., (530, 532, 534), (540, 542, 544)). The just processed stripe, which now includes only a small set of unsafe triangles, may now be merged with a neighboring stripe whose boundary (e.g., 590) is crossed by circles 538 and 548. The merged stripe will still be small enough to perform in-memory triangulation.

Figure 6:
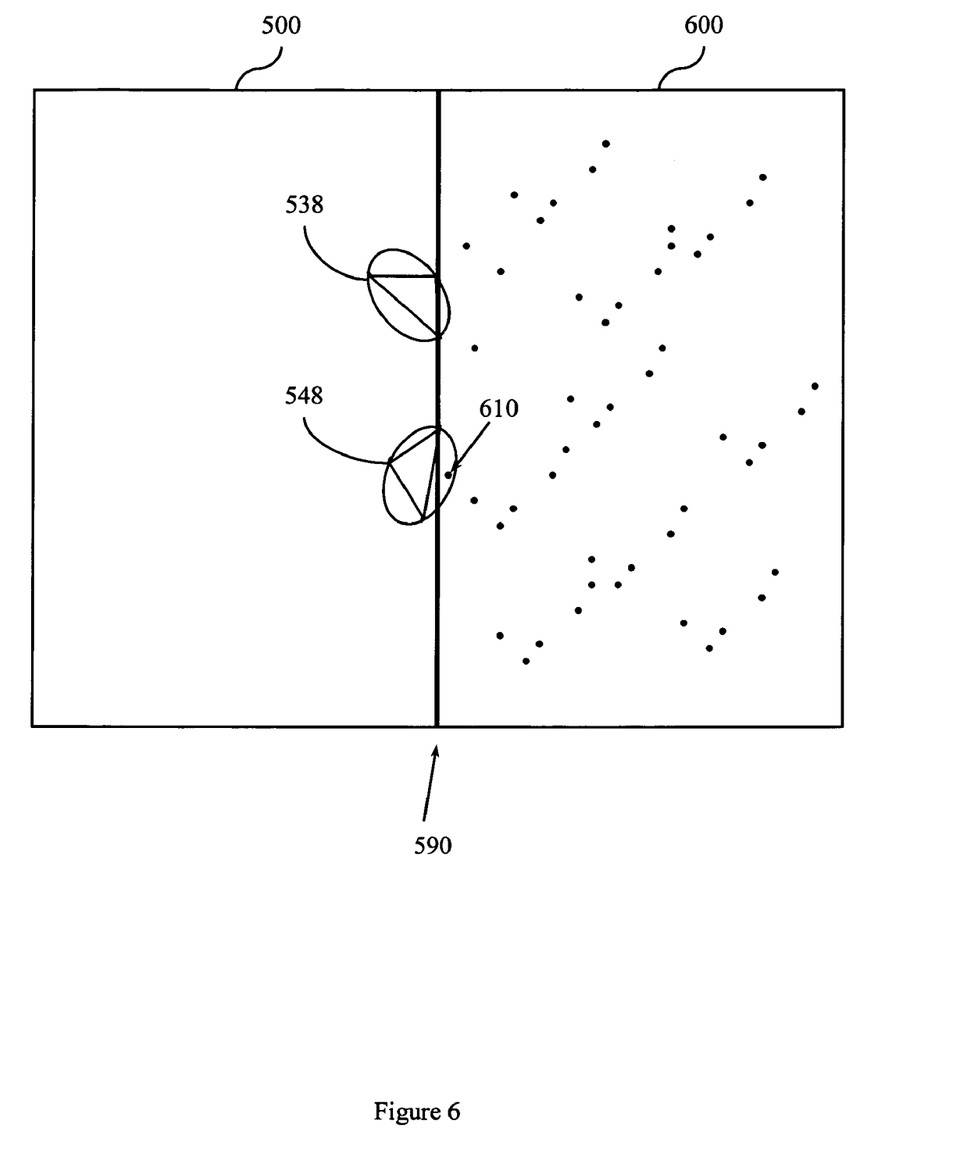
FIG. 6 illustrates the result of merging a processed stripe with an unprocessed stripe.

After merging, unsafe triangles can be re-examined to determine whether they are safe or invalid. This re-examination may involve processing objects into which unsafe triangles and/or corresponding points were stored. Examining FIG. 6, the triangle circumscribed by circle 538 can be determined to be safe after stripe 500 is merged with stripe 600 because circle 538 covers no additional points in stripe 600. However, the triangle circumscribed by circle 548 can be determined to be invalid because it covers an additional point 610 in stripe 600. Triangles that are determined to be safe may be removed from the merged data set and triangles and corresponding data points written to associated objects. Triangles that are invalid may, for example, be dissolved into their constituent data points and/or otherwise returned to a data set for subsequent re-triangulation. The merged data set, which now includes the previously non-triangulated data points and the recently dissolved data points may now itself be triangulated and the process of triangulation, safe triangle removal, stripe merging, triangle re-evaluation, and triangulation repeated until a pre-determined number (e.g., all) stripes have been processed. An end condition can be imposed when the final stripe is merged with the processed data set. The end condition may define remaining unsafe triangles as safe triangles for which information can be stored in a TIN. Processing can then conclude.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and so on. It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, transmitting, retrieving, communicating, calculating, determining, displaying, and so on, refer to actions and processes of a computer system, logic, processor, or similar electronic device that manipulates and transforms data represented as physical (electronic) quantities.

Figure 7:
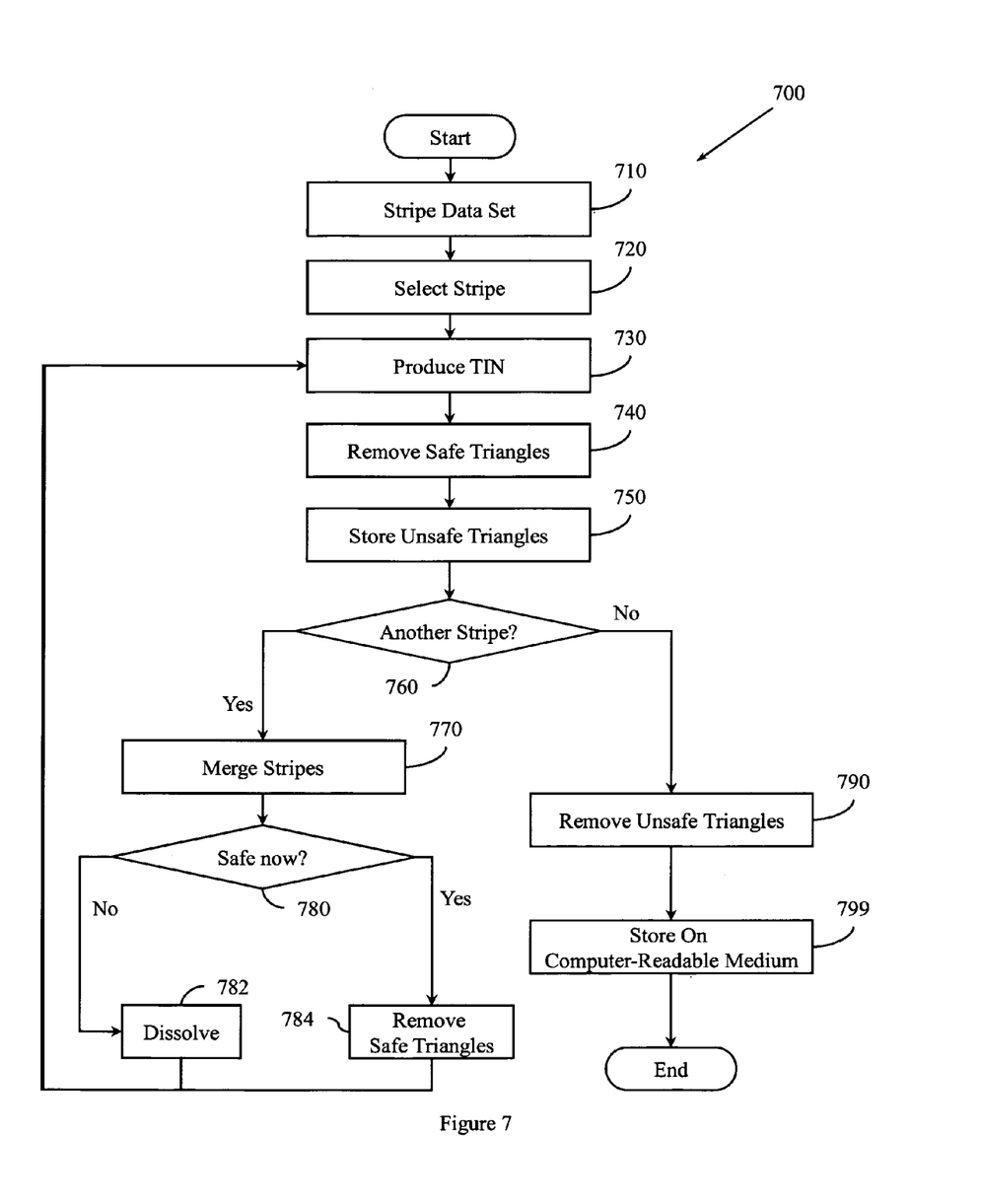
FIG. 7 illustrates an example method associated with in-memory triangulation of an arbitrarily large data set.

FIG. 7 illustrates an example computer-implemented method 700 associated with in-memory triangulation of an arbitrarily large data set. Method 700 may include, at 710, striping an arbitrarily large data set into two or more stripes. The arbitrarily large data set may be too large to perform an in-memory triangulation upon. Therefore, a stripe may be made small enough to perform an in-memory triangulation upon. A stripe may be, for example, a logical partition of the large data set. In one example, the data set comprises three dimensional geographical information system data. The data set may, therefore, include values representing three dimensional (e.g., (x,y,z)) data. In one example, striping the data set includes partitioning the data set along a single axis. The single axis may be, for example, a horizontal axis or a vertical axis. While a horizontal and vertical axis are described, it is to be appreciated that other axes (e.g., off-vertical, off-horizontal) may be employed. In one example, the size of a stripe may be determined, at least in part, by an amount of memory available to the computer performing method 700. In different examples, stripe sizes may be fixed to certain sizes, may vary depending on the number of data points in the data set, may depend on the amount of memory available at the time the stripe is to be triangulated, and so on.

Method 700 may also include, at 720, selecting a current stripe from the two or more stripes. The stripe selected may be, for example, a stripe at the edge of the data set. After selecting the stripe, it will be established as a "current" stripe and loaded into a computer memory associated with the computer performing method 700.

Method 700 may also include, at 730, producing a triangulated irregular network (TIN) for the current stripe. The TIN will be produced in the computer memory. In one example, producing the TIN includes performing Delaunay triangulation on data points in the current stripe. Therefore, in one example the TIN may include a set of safe triangles and a set of unsafe triangles. A safe triangle may be defined as a triangle circumscribed by a circle that covers no point in the data set other than the three points that define the safe triangle. Additionally, to be a safe triangle, the circle may not intersect a currently shared boundary of the stripes being merged. Similarly, an unsafe triangle may be defined as a triangle circumscribed by a circle that intersects a boundary of the currently shared stripe boundary. Since it intersects a boundary it can not be determined whether the circle covers a data point in a neighboring stripe. In one example, a safe triangle may be defined as a verifiable Delaunay triangle and an unsafe triangle may be defined as an unverifiable Delaunay triangle.

Method 700 may also include, at 740, removing the set of safe triangles from the TIN. Removing the set of safe triangles from the TIN may include updating different data structures. For example, removing the set of safe triangles may include updating a triangles data store with information concerning a member of the set of safe triangles and updating a points data store with corresponding point information from the current stripe. This updating may include adding data to the data structures. The data structures may be large objects and/or may be configured to store large objects. Additionally, removing the set of safe triangles may include updating other data structures including the TIN and the current stripe. This updating may include removing data from the data structures.

Method 700 may also include, at 750, storing information associated with the set of unsafe triangles. This may include, for example, storing triangles and/or corresponding point data in an unsafe triangles and/or unsafe points data structure(s). Like the data structures associated with the safe triangles, these data structures may store large objects and/or may be large objects.

Method 700 may also include, at 760, determining whether there is another stripe to process. If there is, processing may continue at 770, otherwise processing may continue at 790.

Method 700 may include, at 770, merging an unprocessed stripe adjacent to the current stripe into the current stripe. In one example, merging an unprocessed stripe adjacent to the current stripe into the current stripe may include redefining the current stripe to include data points from the current stripe and the unprocessed adjacent stripe. As this process is repeated in successive iterations of the method, eventually all the stripes will be merged together. However, rather than recreating the arbitrarily large data set that may be too large for in-memory processing, removing the safe triangles from each stripe on the fly will yield a smaller, more manageable data set that can be processed in-memory.

Method 700 may also include, at 780, making a determination concerning whether a triangle that was initially thought to be unsafe may now be considered to be a safe triangle. A triangle may have been placed in the set of unsafe triangles because its circumscribing circle overlapped a stripe boundary. After adjacent stripes are merged, the initially unsafe triangle may be determined to be a safe triangle if it can be determined that the circumscribing circle does not cover any data points in the adjacent stripe.

If the determination is that the triangle is still unsafe, processing may continue at 782 with "dissolving" the unsafe triangle. This may include returning its three points to the data set in the current stripe before the stripe is triangulated. While "dissolving" is described, it is to be appreciated that the points may be handled in other manners.

If the determination is that the triangle is now safe, method 700 may proceed, at 784, by removing a member of the set of unsafe triangles from the TIN.

Method 700 may also include, at 790, upon determining at 760 that there are no stripes remaining to be processed, redefining members of the set of unsafe triangles as safe triangles and removing the members of the set of unsafe triangles from the TIN. In one example, removing a member of the set of unsafe triangles from the TIN includes adding information to some data store(s) and removing data from another data store(s). For example, removing a member may include, updating a triangles data store with information describing the member of the set of unsafe triangles and updating a points data store with corresponding point information from the current stripe. This updating may include adding data to the data structure(s) and/or data store(s). Removing the member may also include updating the TIN and updating the current stripe. This updating may include removing data.

Method 700 may also include, at 799, storing information associated with the set of safe triangles on a computer-readable medium. In this way method 700 fixes the results of its processing in a tangible medium causing a physical transformation.

Figure 8:
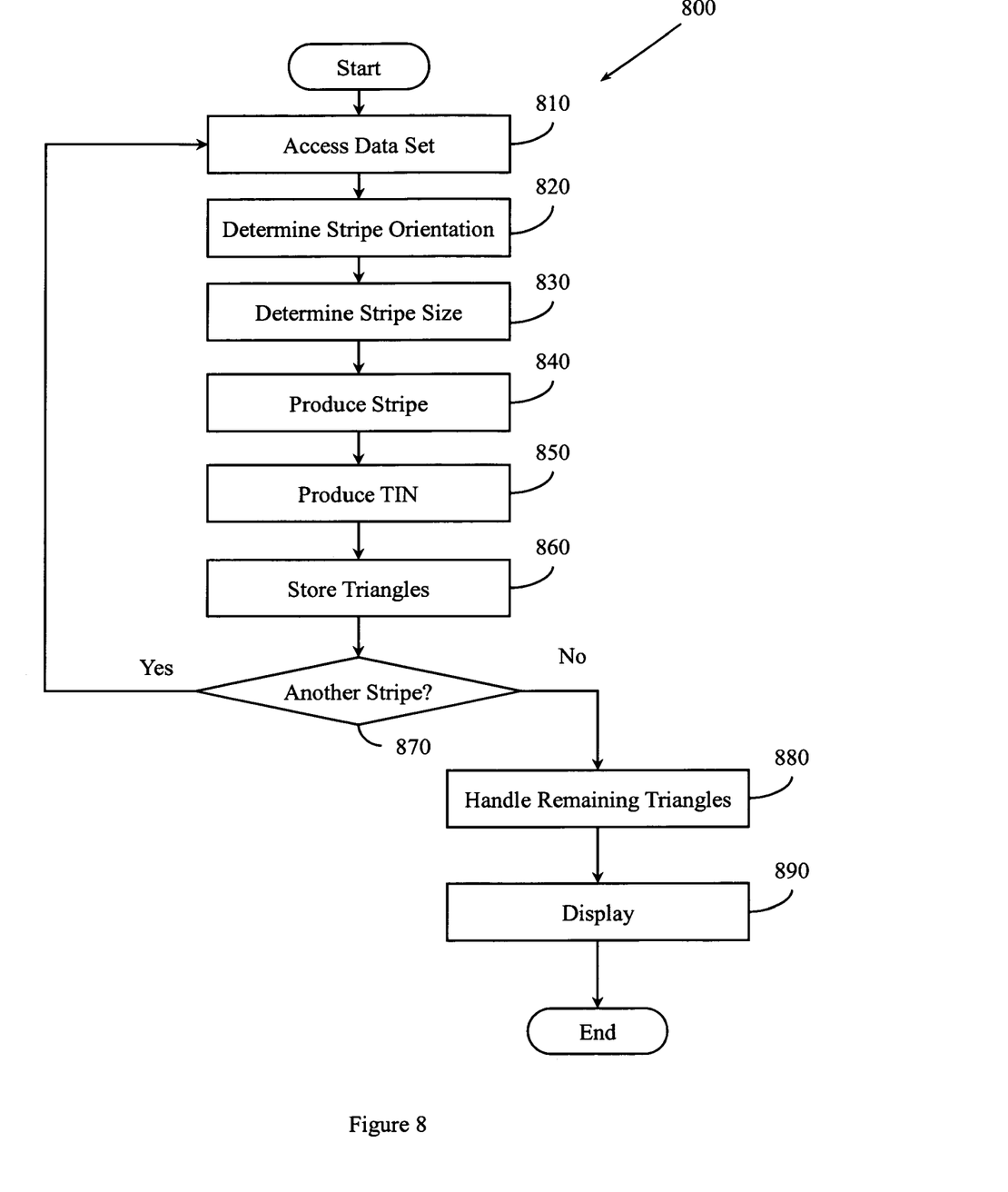
FIG. 8 illustrates an example method associated with in-memory triangulation of an arbitrarily large data set.

FIG. 8 illustrates an example method 800 associated with in-memory triangulation of an arbitrarily large data set. Method 800 may include, at 810, accessing a data set. Method 800 may also include, at 820, determining an orientation for a stripe to partition out a subset of data from the data set. The orientation may be, for example, horizontal, vertical, or some other orientation. Method 800 may also include, at 830, determining a stripe size. The size may depend on factors including, for example, the number of data points to be processed, the size of memory available to perform in-memory triangulation, and so on. Method 800 may also include, at 840, producing the stripe. The stripe may then be made available to an in-memory triangulation logic and/or process.

Therefore, method 800 may include, at 850, producing a TIN for the stripe. The TIN may include a number of triangles, some of which can be handled (e.g., stored) immediately, while others may need to have their handling (e.g., storing) postponed until a subsequent stripe(s) is processed. Therefore, method 800 may include, at 860, handling some triangles and then, at 870, determining whether there is another stripe to process. Handling the triangles at 870 may include, for example, storing data associated with a set of triangles associated with the TIN. If the determination at 870 is yes, then processing may return to 810. Otherwise, processing may proceed to 880 where remaining triangles are processed. With all possible triangles processed, method 800 may conclude at 890 by displaying an item associated with the data set, stripe(s), TIN, and/or triangles. For example, method 800 may display a terrain visualized through the triangles produced and handled by method 800.

Figure 9:
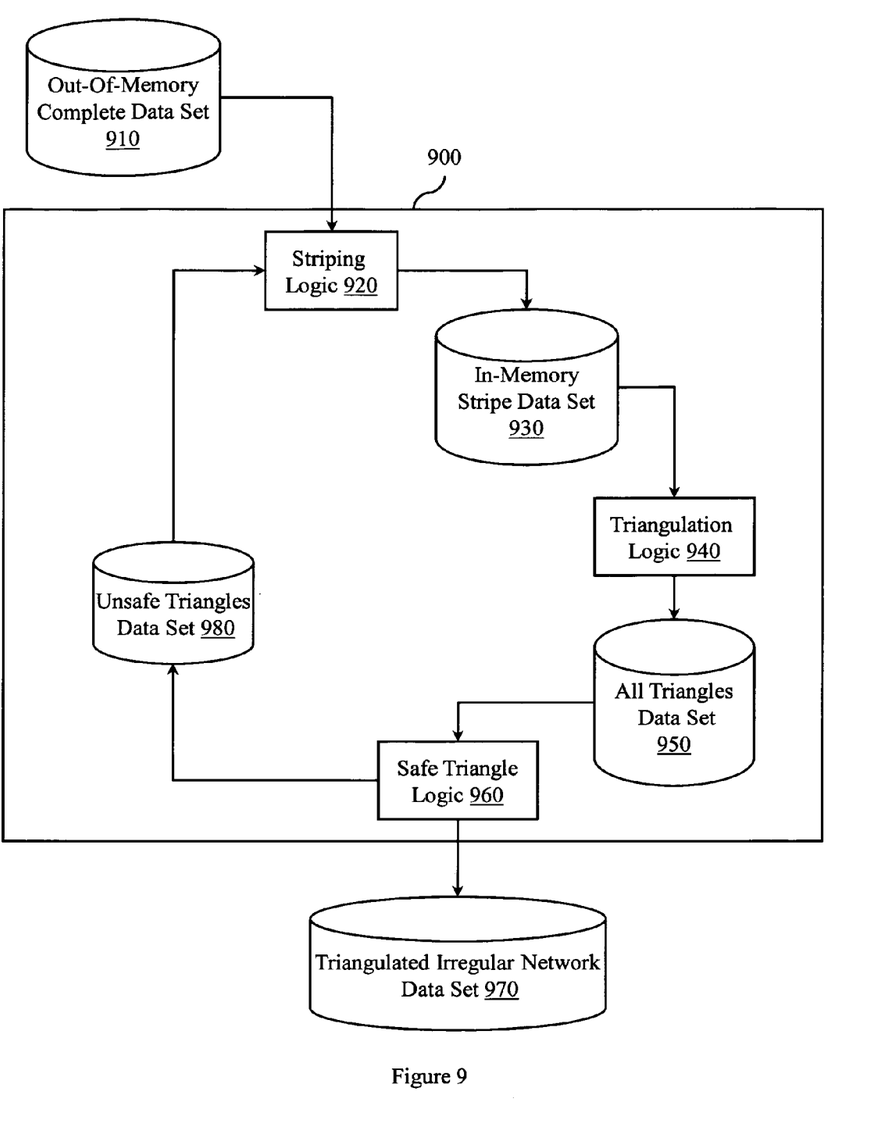
FIG. 9 illustrates an example system associated with in-memory triangulation of an arbitrarily large data set.

FIG. 9 illustrates an example computing system 900 associated with in-memory triangulation of an arbitrarily large data set. The system 900 may interact with an out-of-memory complete data set 910. This data set 910 may be stored, for example, on a large capacity storage device (e.g., disk, tape). The data set 910 may include data that represents, for example, a three-dimensional surface. The data set 910 may, for example, be provided by a geographic information system concerned with region approximation. The computing system 900 may seek to represent that three-dimensional surface as a set of irregularly shaped triangles. Thus, computing system 900 may produce a TIN data set 970. TIN data set 970 may include, for example, a set of local TINs each associated with a portion of complete data set 910. While data set 910 and data set 970 are illustrated outside system 900, it is to be appreciated that data set 910 and/or data set 970 may reside within system 900.

In one example, computing system 900 may include a striping logic 920 to manipulate an in-memory stripe data set 930. The manipulation (e.g., creation, updating) may be based, at least in part, on the out-of-memory complete data set 910 and an unsafe triangles data set 980. The unsafe triangles data set 980 may initially be empty but may be updated by a safe triangle logic 960. In one example the striping logic 920 may be configured to determine an orientation for a subset of the out-of-memory complete data set 910 that is to be added to the in-memory stripe data set 930. Additionally, the striping logic 920 may be configured to determine a size for the in-memory stripe data set 930. The orientation and/or the size may be based, at least in part, on a relation between the out-of-memory complete data set 910, the in-memory stripe data set 930, and the amount of memory available to computing system 900.

System 900 may also include a triangulation logic 940 to manipulate an all triangles data set 950. This manipulation (e.g., creation, updating) may be based, at least in part, on an in-memory triangulation of the in-memory stripe data set 930. In one example, the in-memory triangulation may be a Delaunay triangulation.

System 900 may also include a safe triangle logic 960 to manipulate the triangulated irregular network (TIN) data set 970 and the unsafe triangles data set 980. The manipulating may be based, at least in part, on the all triangles data set 950, which may store both safe and unsafe triangles. A safe triangle may be, for example, a verifiable Delaunay triangle and an unsafe triangle may be an unverifiable Delaunay triangle. Safe triangles may be moved to the TIN data set 970 while unsafe triangles are moved to the unsafe triangles data set 980. In one example the TIN data set 970 represents a TIN of the out-of-memory complete data set 910. In one example, the striping logic 920 may selectively add additional data points from the out-of-memory complete data set 910 to the in-memory stripe data set 930 in stripe subsets until a predetermined threshold amount of the out-of-memory complete data set 910 has been processed. This threshold may be, for example, one hundred percent of the data.

Figure 10:
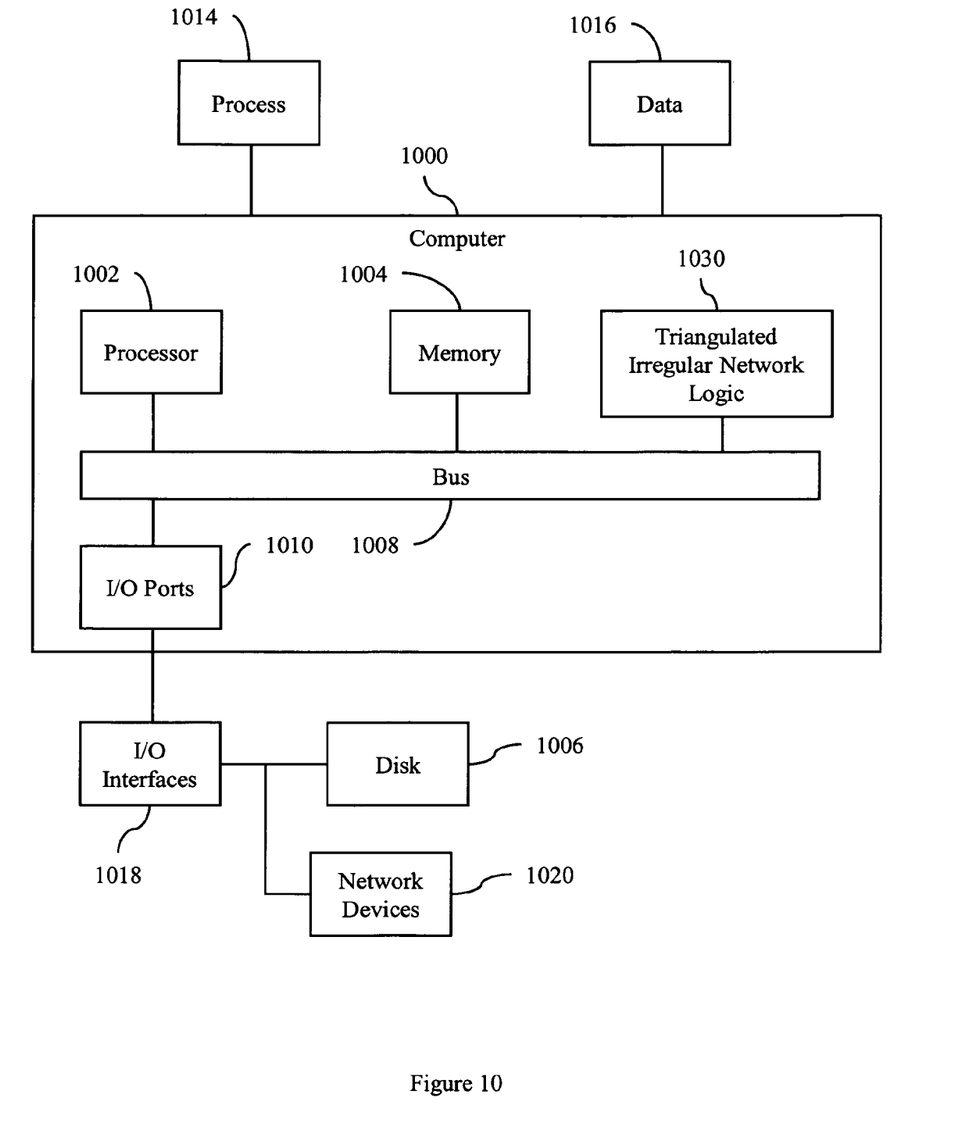
FIG. 10 illustrates an example computing device in which example systems and/or methods may operate.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a triangulated irregular network logic 1030 associated with performing an in-memory triangulation of an arbitrarily large data set. In different examples, the logic 1030 may be implemented in hardware, software, firmware, and/or combinations thereof. Thus, the logic 1030 may provide means (e.g., hardware, software, firmware) for partitioning an arbitrarily large geographical information data set into a set of stripes. The set of stripes may have a determined size and/or orientation determined, at least in part, by the amount of memory available to computer 1000. Logic 1030 may also provide means (e.g., hardware, software, firmware) for in-memory creation of a set of local TINs corresponding to members of the set of stripes. A local TIN may be created for each partition in turn so that a TIN may be created in-memory for the entire arbitrarily large data set. Logic 1030 may also provide means (e.g., hardware, software, firmware) for storing information associated with triangles associated with the set of local TINs. This information may represent a TIN for the entire arbitrarily large data set. While the logic 1030 is illustrated as a hardware component attached to the bus 1008, it is to be appreciated that in one example, the logic 1030 could be implemented in the processor 1002.

Generally describing an example configuration of the computer 1000, the processor 1002 may be a variety of various processors including dual microprocessor and other multiprocessor architectures. A memory 1004 may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, and/or a memory stick. Furthermore, the disk 1006 may be a CD-ROM (compact disk ROM), a CD recordable drive (CD-R drive), a CD rewritable drive (CD-RW drive), and/or a digital video ROM drive (DVD ROM). The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., USB (universal serial bus), Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a local area network (LAN), a wide area network (WAN), and other networks.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software in execution, and/or a combination thereof. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device can read.

"Logic", as used herein, includes but is not limited to hardware, firmware, software in execution on a computing device, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms (e.g., routines, modules, methods, threads, programs) including separate applications or code from libraries (e.g., dynamically linked library (DLL)). Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated that computer-readable and/or executable instructions can be located in one logic and/or distributed between two or more communicating, co-operating, and/or parallel processing logics and thus may be loaded and/or executed in serial, parallel, massively parallel and other manners.

"User", as used herein, includes but is not limited to one or more persons, software components, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
   striping a data set into two or more stripes;
   selecting a current stripe from the two or more stripes and loading the current stripe into a computer memory associated with the computer implementing the method;
   repetitively, until the two or more stripes have been processed:
     producing, in memory, a triangulated irregular network (TIN) for the current stripe, where the TIN includes a set of safe triangles and a set of unsafe triangles;
     removing the set of safe triangles from the TIN;
     storing information associated with the set of unsafe triangles;
     merging an unprocessed stripe adjacent to the current stripe into the current stripe; and
     removing a member of the set of unsafe triangles from the TIN upon determining that the member is a safe triangle in light of the current stripe after merging;
   upon determining that the two or more stripes have been processed, redefining members of the set of unsafe triangles as safe triangles and removing members of the set of unsafe triangles from the TIN; and storing information associated with the set of safe triangles on a computer-readable medium.

2. The method of claim 1, where the data set comprises three dimensional geographical information system data.

3. The method of claim 2, where striping the data set includes partitioning the data set along a single axis.

4. The method of claim 3, the single axis being one of, a horizontal axis, and a vertical axis.

5. The method of claim 1, a safe triangle being a triangle circumscribed by a circle, where the circle covers no point in the data set other than three points that define the safe triangle and where the circle does not intersect a currently shared boundary of the current stripe.

6. The method of claim 5, an unsafe triangle being a triangle circumscribed by a circumscribing circle that intersects a currently shared boundary of the current stripe.

7. The method of claim 1, where the size of a stripe is determined, at least in part, by an amount of memory available to the computer implementing the method.

8. The method of claim 1, a safe triangle being a verifiable Delaunay triangle and an unsafe triangle being an unverifiable Delaunay triangle.

9. The method of claim 1, where removing the set of safe triangles from the TIN includes one or more of, updating a triangles data store with information concerning a member of the set of safe triangles, updating a points data store with corresponding point information from the current stripe, updating the TIN, and updating the current stripe.

10. The method of claim 9, where the triangles data store stores one or more large objects and where the points data store stores one or more large objects.

11. The method of claim 1, where producing the TIN includes performing in-memory Delaunay triangulation on data points in the current stripe.

12. The method of claim 1, where merging an unprocessed stripe adjacent to the current stripe into the current stripe includes redefining the current stripe to include data points from the current stripe and the unprocessed stripe adjacent to the current stripe.

13. The method of claim 1, where the member of the set of unsafe triangles can be determined to be a safe triangle in light of the current stripe after the merging by determining whether a circle circumscribing the unsafe member covers a data point in the current stripe other than the three points defining the member.

14. The method of claim 1, where removing a member of the set of unsafe triangles from the TIN includes one or more of, updating a triangles data store with information describing the member of the set of unsafe triangles, updating a points data store with corresponding point information from the current stripe, updating the TIN, and updating the current stripe.

15. A computing system, comprising:
at least one processor for executing at least:
a striping logic to manipulate an in-memory stripe data set based, at least in part, on an out-of-memory complete data set and an unsafe triangles data set;
a triangulation logic to manipulate an all triangles data set based, at least in part, on an in-memory triangulation of the in-memory stripe data set; and
a safe triangle logic to manipulate a triangulated irregular network (TIN) data set and the unsafe triangles data set based, at least in part, on the all triangles data set,
where the TIN data set represents a TIN of the out-of-memory complete data set.

16. The computing system of claim 15, where the striping logic is configured to determine an orientation for a subset of the out-of-memory complete data set to be added to the in-memory stripe data set and to determine a size for the in-memory stripe data set based, at least in part, on a relation between the out-of-memory complete data set, the in-memory stripe data set, and the amount of memory available to the computing system.

17. The computing system of claim 16, where the in-memory triangulation is a Delaunay triangulation.

18. The computing system of claim 17, where the safe triangle logic adds safe triangles from the all triangles data set to the TIN data set and moves unsafe triangles from the all triangles data set to the unsafe triangles data set.

19. The computing system of claim 18, where a safe triangle is a verifiable Delaunay triangle.

20. The computing system of claim 19, where an unsafe triangle is an unverifiable Delaunay triangle.

21. The computing system of claim 20, where the striping logic selectively adds additional data points from the out-of-memory complete data set to the in-memory stripe data set in stripe subsets until a pre-determined threshold amount of the out-of-memory complete data set has been processed.

22. The computing system of claim 21, the pre-determined threshold being one hundred percent.

23. A computer-readable medium storing computer-executable instructions that when executed by the computer cause the computer to perform a method, the method comprising:
accessing a data set;
determining an orientation for a stripe to partition the data set;
determining a size for the stripe;
producing the stripe in accordance with the orientation and the size;
producing a triangulated irregular network (TIN) for the stripe; and
storing data associated with a set of triangles associated with the TIN.

24. The computer-readable medium of claim 23, where the orientation and the size depend, at least in part, on a relation between the size of the data set and the amount of memory available in the computer caused to perform the method.

25. A system, comprising:
means for partitioning an arbitrarily large geographical information data set into a set of stripes;
means for in-memory creation of a set of local triangulated irregular networks (TINs) corresponding to members of the set of stripes; and
means for storing information associated with triangles associated with the set of local TINs.

* * * * *

UNITED STATES PATENT AND TRADEMARK OFFICE
CERTIFICATE OF CORRECTION

| | | |
|---|---|---|
| PATENT NO. | : 7,774,381 B2 | |
| APPLICATION NO. | : 12/069089 | |
| DATED | : August 10, 2010 | |
| INVENTOR(S) | : Ravi Kothuri et al. | |

It is certified that error appears in the above-identified patent and that said Letters Patent is hereby corrected as shown below:

Title page, Item (74), "Attorney, Agent or Firm", line 1, delete "Kraguljac + Kalnay," and insert -- Kraguljac & Kalnay, --, therefor.

In column 10, line 12, delete "servelet," and insert -- servlet, --, therefor.

Signed and Sealed this
Tenth Day of May, 2011

David J. Kappos
*Director of the United States Patent and Trademark Office*